(12) United States Patent
Schneider et al.

(10) Patent No.: US 12,470,498 B2
(45) Date of Patent: Nov. 11, 2025

(54) BEHAVIORAL MODELING FOR DYNAMIC SECURITY CONTROL APPLICATIONS

(71) Applicant: Google LLC, Mountain View, CA (US)

(72) Inventors: Christopher Schneider, Edinburgh (GB); Bessie S Jiang, London (GB); Martin Sablotny, Everett, WA (US); J. Nicolas Watson, Reston, VA (US)

(73) Assignee: Google LLC, Mountain View, CA (US)

( * ) Notice: Subject to any disclaimer, the term of this patent is extended or adjusted under 35 U.S.C. 154(b) by 10 days.

(21) Appl. No.: 18/374,375

(22) Filed: Sep. 28, 2023

(65) Prior Publication Data

US 2025/0112874 A1   Apr. 3, 2025

(51) Int. Cl.
*H04L 47/80*   (2022.01)
*H04L 9/40*   (2022.01)

(52) U.S. Cl.
CPC ............ *H04L 47/801* (2013.01); *H04L 63/20* (2013.01)

(58) Field of Classification Search
CPC ....... H04L 47/801; H04L 63/20; H04L 63/14; H04L 63/10
USPC ........................................................ 709/238
See application file for complete search history.

(56) References Cited

U.S. PATENT DOCUMENTS

| | | | | |
|---|---|---|---|---|
| 11,146,617 | B1* | 10/2021 | Kangas | H04L 63/0245 |
| 11,374,903 | B1* | 6/2022 | Li | H04L 63/0227 |
| 2019/0121979 | A1* | 4/2019 | Chari | G06F 8/433 |
| 2019/0278928 | A1* | 9/2019 | Rungta | G06F 9/45533 |
| 2021/0303693 | A1* | 9/2021 | Polakovic | G06F 8/63 |
| 2022/0207163 | A1* | 6/2022 | Gentleman | G06F 21/62 |

FOREIGN PATENT DOCUMENTS

| | | | | |
|---|---|---|---|---|
| CN | 114169456 | A * | 3/2022 | G06F 18/241 |
| CN | 115664821 | A * | 1/2023 | |
| CN | 115935220 | A * | 4/2023 | |
| CN | 116318934 | A * | 6/2023 | |

* cited by examiner

*Primary Examiner* — Ruolei Zong
(74) *Attorney, Agent, or Firm* — Lowenstein Sandler LLP

(57) ABSTRACT

Baseline data characterizing actions of one or more computing resources associated with one or more entities is received. One or more functional roles performed by the one or more computing resources are identified using a machine learning model, wherein the baseline data is provided as input to the machine learning model. A security-related control to be applied to the one or more computing resources is identified based on the one or more functional roles. The security-related control is applied to the one or more computing resources.

20 Claims, 5 Drawing Sheets

BEHAVIORAL MODELING FOR DYNAMIC SECURITY CONTROL APPLICATIONS

TECHNICAL FIELD

Aspects and implementations of the present disclosure relate to providing behavioral modeling for dynamic security control applications.

BACKGROUND

In infrastructure and application security, computing resources, such as computing resources of cloud computing platforms, can be susceptible to intrusive activity. In particular, computing resources with machine learning-enabled services, such as large language models (LLMs), can be especially susceptible to intrusive activity because LLMs can allow users to inject new logic into the backend of a system (e.g., by modifying or adding new rules, prompts, etc. using an LLM) that can change data or control flows of the computing resources in unexpected ways. Examples of intrusive activity include installation or operation of malware (e.g., malicious software), workflow escapes (e.g., deviating from an intended or expected sequence of steps within an application's workflow, leading to unauthorized access of computing resources, data exposure, etc.), exploiting control gaps (e.g., exploiting vulnerabilities that arise due to shortcomings in the implementation, design, and/or management of security controls within an application or system), accessing or attempting to access computing resources without permission or authorization, modifying or exfiltrating data stored on computing resources without permission or authorization, exhausting computing resources (e.g., a denial-of-service attack), and other forms of unwanted activity. Intrusive activity can lead to interruption or inefficient operation of computing resources, which can be problematic for owners and operators of computing resources. In extreme cases, intrusive activity can damage computing resources or data stored thereon, potentially causing substantial financial loss and other losses and liabilities for the owners and operators of computing resources.

Security platforms typically have intrusive activity security control mechanisms in place that observe the behavior of various assets (e.g., computing resources), and recommend security controls to be applied to each asset. The intrusive activity can then be mitigated, e.g., by blocking an intrusive file from being downloaded, stopping intrusive processes that are running, etc. Security control in conventional security platforms is often a manual and time-consuming process for subject matter experts (e.g., security professionals), which can result in human errors and can strain the human resources of security teams, thereby decreasing the overall effectiveness and intrusive activity security control coverage of the security platform.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for providing behavioral modeling for dynamic security control applications. In an implementation, a method includes receiving, by a processing device, baseline data characterizing actions of one or more computing resources associated with one or more entities. The method further includes identifying, using a machine learning model, one or more functional roles performed by the one or more computing resources, wherein the baseline data is provided as input to the machine learning model. The method further includes identifying, based on the one or more functional roles, a security-related control to be applied to the one or more computing resources. The method further includes applying the security-related control to the one or more computing resources. In some embodiments, the baseline data characterizing actions of one or more computing resources is based on at least one of network traffic originated by the one or more computing resources, or network traffic received by the one or more computing resources.

In some embodiments, the machine learning model is trained to predict, based on given data associated with previous actions of the one or more computing resources, the one or more functional roles performed by the one or more computing resources.

In some embodiments, to identify, based on the one or more functional roles, the security-related control to be applied to the one or more computing resources, the method further includes identifying, for the one or more functional roles, one or more associated security-related rules; and determining, according to the one or more associated security-related rules, the security-related control to be applied to the one or more computing resources. In some embodiments, the one or more associated security-related rules is specified by a user associated with the one or more entities.

In some embodiments, to identify, based on the one or more functional roles, the security-related control to be applied to the one or more computing resources, the method further includes identifying, using a second machine learning model, the security-related control to be applied to the one or more computing resources, wherein the one or more functional roles and the baseline data characterizing the actions of the one or more computing resources are provided as input to the second machine learning model.

In some embodiments, the method further includes responsive to applying the security-related control to the one or more computing resources, monitoring one or more actions of the one or more computing resources. The method further includes detecting that an action of the one or more actions is incompatible with the one or more functional roles performed by the one or more computing resources. The method further includes, responsive to detecting that the action is incompatible with the one or more functional roles performed by the one or more computing resources, performing a remedial action to the one or more computing resources.

In some embodiments, to detect that the action of the one or more actions is incompatible with the one or more functional roles performed by the one or more computing resources, the method further includes determining that the action is not included in a set of actions associated with the one or more functional roles, wherein the set of actions associated with the one or more functional roles is derived from the baseline data characterizing the actions of the one or more computing resources.

In some embodiments, to detect that the action of the one or more actions is incompatible with the one or more functional roles performed by the one or more computing resources, the method further includes determining that the action does not satisfy one or more compliance requirements associated with the functional role.

In some embodiments, a computer-readable storage medium (which may be non-transitory computer-readable storage medium, although the invention is not limited to that) stores instructions which, when executed, cause a processing device to perform operations comprising receiving, by the processing device, baseline data characterizing actions of one or more computing resources associated with one or more entities. The operations further include identifying, using a machine learning model, one or more functional roles performed by the one or more computing resources, wherein the baseline data is provided as input to the machine learning model. The operations further include identifying, based on the one or more functional roles, a security-related control to be applied to the one or more computing resources. The operations further include applying the security-related control to the one or more computing resources. In some embodiments, the baseline data characterizing actions of one or more computing resources is based on at least one of network traffic originated by the one or more computing resources, or network traffic received by the one or more computing resources.

In some embodiments, the machine learning model is trained to predict, based on given data associated with previous actions of the one or more computing resources, the one or more functional roles performed by the one or more computing resources.

In some embodiments, to identify, based on the one or more functional roles, the security-related control to be applied to the one or more computing resources, the operations further include identifying, for the one or more functional roles, one or more associated security-related rules; and determining, according to the one or more associated security-related rules, the security-related control to be applied to the one or more computing resources. In some embodiments, the one or more associated security-related rules is specified by a user associated with the one or more entities.

In some embodiments, to identify, based on the one or more functional roles, the security-related control to be applied to the one or more computing resources, the operations further include identifying, using a second machine learning model, the security-related control to be applied to the one or more computing resources, wherein the one or more functional roles and the baseline data characterizing the actions of the one or more computing resources are provided as input to the second machine learning model.

In some embodiments, the operations further include responsive to applying the security-related control to the one or more computing resources, monitoring one or more actions of the one or more computing resources. The operations further include detecting that an action of the one or more actions is incompatible with the one or more functional roles performed by the one or more computing resources. The operations further include, responsive to detecting that the action is incompatible with the one or more functional roles performed by the one or more computing resources, performing a remedial action to the one or more computing resources.

In some embodiments, to detect that the action of the one or more actions is incompatible with the one or more functional roles performed by the one or more computing resources, the operations further include determining that the action is not included in a set of actions associated with the one or more functional roles, wherein the set of actions associated with the one or more functional roles is derived from the baseline data characterizing the actions of the one or more computing resources.

In some embodiments, to detect that the action of the one or more actions is incompatible with the one or more functional roles performed by the one or more computing resources, the operations further include determining that the action does not satisfy one or more compliance requirements associated with the functional role.

In some embodiments, a system comprises: a memory; and a processing device operatively coupled with the memory to perform operations comprising receiving, by the processing device, baseline data characterizing actions of one or more computing resources associated with one or more entities. The operations further include identifying, using a machine learning model, one or more functional roles performed by the one or more computing resources, wherein the baseline data is provided as input to the machine learning model. The operations further include identifying, based on the one or more functional roles, a security-related control to be applied to the one or more computing resources. The operations further include applying the security-related control to the one or more computing resources. In some embodiments, the baseline data characterizing actions of one or more computing resources is based on at least one of network traffic originated by the one or more computing resources, or network traffic received by the one or more computing resources.

In some embodiments, the machine learning model is trained to predict, based on given data associated with previous actions of the one or more computing resources, the one or more functional roles performed by the one or more computing resources.

In some embodiments, to identify, based on the one or more functional roles, the security-related control to be applied to the one or more computing resources, the operations further include identifying, for the one or more functional roles, one or more associated security-related rules; and determining, according to the one or more associated security-related rules, the security-related control to be applied to the one or more computing resources. In some embodiments, the one or more associated security-related rules is specified by a user associated with the one or more entities.

In some embodiments, to identify, based on the one or more functional roles, the security-related control to be applied to the one or more computing resources, the operations further include identifying, using a second machine learning model, the security-related control to be applied to the one or more computing resources, wherein the one or more functional roles and the baseline data characterizing the actions of the one or more computing resources are provided as input to the second machine learning model.

In some embodiments, the operations further include responsive to applying the security-related control to the one or more computing resources, monitoring one or more actions of the one or more computing resources. The operations further include detecting that an action of the one or more actions is incompatible with the one or more functional roles performed by the one or more computing resources. The operations further include, responsive to detecting that the action is incompatible with the one or more functional roles performed by the one or more computing resources, performing a remedial action to the one or more computing resources.

In some embodiments, to detect that the action of the one or more actions is incompatible with the one or more functional roles performed by the one or more computing resources, the operations further include determining that the action is not included in a set of actions associated with the one or more functional roles, wherein the set of actions associated with the one or more functional roles is derived from the baseline data characterizing the actions of the one or more computing resources.

In some embodiments, to detect that the action of the one or more actions is incompatible with the one or more functional roles performed by the one or more computing resources, the operations further include determining that the action does not satisfy one or more compliance requirements associated with the functional role.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
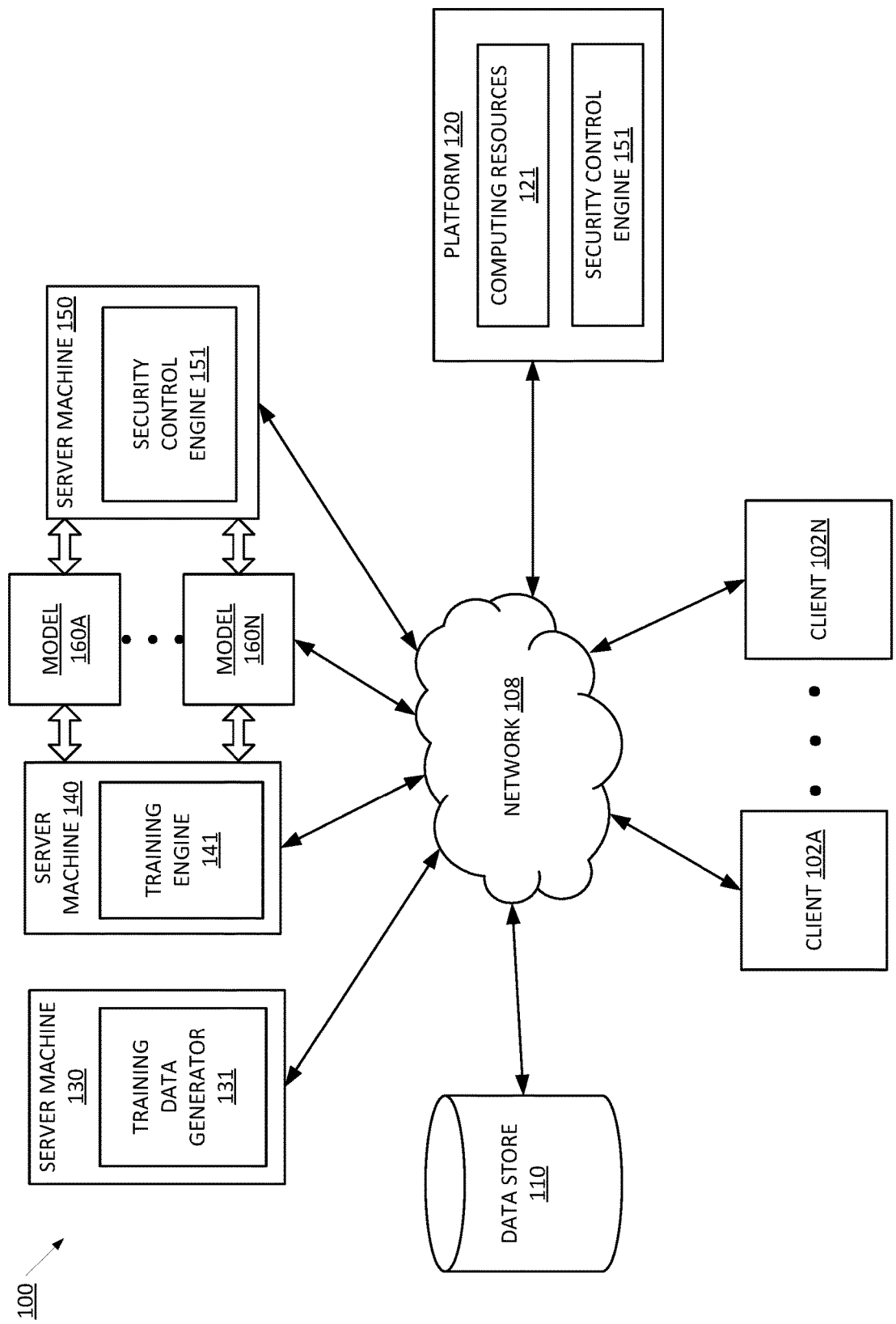
FIG. 1 illustrates an example system architecture, in accordance with implementations of the present disclosure.

Aspects of the present disclosure generally relate to providing behavioral modeling for dynamic security control applications with respect to computing resources. Computing resources can include, for example, servers, data centers, applications, and cloud computing resources. In particular, computing resources with machine learning-enabled services, such as large language models (LLMs), can be especially susceptible to intrusive activity because LLMs can allow users to inject new logic into the backend of a system (e.g., by modifying or adding new rules, prompts, etc. using an LLM) that can change data or control flows of the computing resources in unexpected ways. Various computing resources can be susceptible to intrusive activity. Examples of intrusive activity include installation or operation of malware (e.g., malicious software), workflow escapes (e.g., deviating from an intended or expected sequence of steps within an application's workflow, leading to unauthorized access of computing resources, data exposure, etc.), exploiting control gaps (e.g., exploiting vulnerabilities that arise due to shortcomings in the implementation, design, and/or management of security controls within an application or system), accessing or attempting to access computing resources without permission or authorization, modifying or exfiltrating data stored on computing resources without permission or authorization, exhausting computing resources (e.g., a denial-of-service attack), and other forms of unwanted activity. Intrusive activity is often problematic for owners and operators of computing resources because the intrusive activity can lead to interruption or inefficient operation of computing resources, or in extreme cases, substantial financial loss and liabilities.

Security platforms can have intrusive activity security control mechanisms in place that receive data (e.g., system event logs or new files inbound from a network connection) characterizing the behavior of various assets (e.g., computing resources), and recommend security-related controls to be applied to each asset. The intrusive activity can then be mitigated, e.g., by blocking an intrusive file from being downloaded, stopping intrusive processes that are running, etc. Security information and event management (SIEM) products are examples of security platforms and can include software, hardware, and managed service components.

Security control in conventional security platforms is often a manual and time-consuming process for subject matter experts (e.g., security professionals), which can result in human errors and can strain the human resources of security teams, thereby decreasing the overall effectiveness and intrusive activity security control coverage of the security platform. For example, a skilled security professional (e.g., a security researcher) may expend considerable time manually analyzing data such as event logs to identify behaviors (e.g., patterns and commonalities) of computing resources that can be used to detect an instance or class of intrusive activity. The security professional can then craft one or more behavioral modeling rules that are responsive to the same patterns in live data (e.g., client data) and generate appropriate security-related controls to be applied based on the behaviors of the computing resources. This manual process is prone to error and can require additional time-consuming testing and verification of hand-crafted rules before the rules are deployed into production (e.g., evaluated on live data or client systems), causing needless consumption of computing resources allocated to support such additional testing and verification operations. The time-consuming nature of conventional behavioral modeling can strain the human resources of security teams. Furthermore, user-generated rules can be crafted in ways that consume excess CPU, memory, or other resources, and user-generated rules can also have overlapping threat coverage that results in redundant computation. These challenges decrease the overall efficiency, effectiveness, and threat coverage of the security platform. In some situations, security professionals may find it more efficient to write a bespoke script or program to automate aspects of this manual process, but the scripts themselves require updating and maintenance as systems and data change, further contributing to the above-mentioned problems.

Another challenge in conventional security platforms is that computing resources with machine learning-enabled services, such as large language models (LLMs), can be especially susceptible to intrusive activity. In particular, LLMs can allow users to inject new logic into the backends of systems (e.g., by modifying or adding new rules, prompts, etc. using an LLM) that can change data or control flows of the computing resources in unexpected ways that conventional security platforms cannot easily detect and remediate without expending excess CPU, memory, or other resources.

Aspects of the present disclosure address the above and other deficiencies by providing behavioral modeling for dynamic security control applications with respect to computing resources. Security platforms and other systems or services utilizing the techniques described herein can include a security control engine to receive data characterizing actions of computing resources (e.g., hardware, execution environments, application instances, networking infrastructure elements, etc.), identify functional roles (e.g., a type of computing resource) performed by the computing resources, identify security-related controls to be applied to the computing resources, and apply the security-related controls to the computing resources. For example, in at least one embodiment, the security control engine can receive baseline data characterizing one or more actions of one or more computing resources of one or more entities, where the baseline data can be based on (or be derived from) network traffic originated by the one or more computing resources, or network traffic received by the one or more computing resources. The data can be generated or received from internal or external sources, such as a data generator or a user (e.g., a security professional or a client of a cloud platform). The security control engine can identify (e.g., using a machine learning model and/or a set of rules) one or more functional roles performed by the one or more computing resources. The security control engine can identify a security-related control to be applied to the one or more computing resources based on the identified one or more functional roles performed by the one or more computing resources. In some embodiments, the security control engine can apply the security-related control to the one or more computing resources. In some embodiments, in response to applying the security-related control, the security control engine can continue to monitor the actions of the one or more computing resources. In response to detecting that the actions of the one or more computing resources are incompatible with the identified one or more functional roles performed by the one or more computing resources, the security control engine can perform a remedial action with respect to the one or more computing resources.

Accordingly, security platforms using the techniques described herein can provide improved accuracy and efficiency when detecting intrusive activity and applying security-related controls with respect to computing resources. Behavioral modeling, such as by using rules and/or incorporating machine learning models trained on historical data (e.g., previous actions of computing resources), can provide improved threat coverage while reducing false positives, and can also provide optimized rules that use computing resources more efficiently than rules generated with conventional techniques. Thus, a security platform can experience reduced operating costs and improved latency and throughput, which can benefit clients as well and increase trust in the security platform.

FIG. 1 illustrates an example system architecture 100, in accordance with implementations of the present disclosure. The system architecture 100 (also referred to as "system" herein) includes client devices 102A-N, a data store 110, a platform 120, and/or a server machine 150 each connected to a network 10. In implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 108.

The client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." Client devices 102A-N can include a content viewer. In some implementations, a content viewer can be an application that provides a user interface (UI) for users to view or upload content, such as images, video items, web pages, documents, etc. For example, the content viewer can be a web browser that can access, retrieve, present, and/or navigate content (e.g., web pages such as Hyper Text Markup Language (HTML) pages, digital media items, etc.) served by a web server. The content viewer can render, display, and/or present the content to a user. The content viewer can also include an embedded media player (e.g., a Flash® player or an HTML5 player) that is embedded in a web page (e.g., a web page that may provide information about a product sold by an online merchant). In another example, the content viewer can be a standalone application (e.g., a mobile application or app) that allows users to view digital media items (e.g., digital video items, digital images, electronic books, etc.).

In some embodiments, platform 120 can include a security control engine 151. The security control engine 151 can identify one or more functional roles of a group of one or more computing resources (e.g., hardware, execution environments, application instances, networking infrastructure elements, etc.) based on observed behaviors of the group of computing resources. The security control engine 151 can further identify security-related controls to be applied to the group of computing resources based on the identified functional roles.

In some implementations, the observed behavior can include information identifying any actions of the computing resources such as data processing (e.g., computation tasks, data manipulation, etc.), reading and writing data to and from memory, managing data storage, network communication (e.g., data transmission, packet routing, network requests, network traffic, etc.), resource allocation, etc. For example, an observed behavior can include a data transmission using Secure Sockets Layer (SSL)/Transport Layer Security (TLS) port 443.

In some implementations, the functional role can be, e.g., a type of computing resource such as a web server, an application server, a network interface, a cloud resource, a network resource, a hardware device, etc. For example, identifying the functional role can include identifying that a computing resource 121 displaying the aforementioned observed behavior is a web server.

In some embodiments, a functional role can be associated with a computing resource based on its observed behavior, e.g., by a machine learning model (e.g., a first machine learning model 160A-N). For example, the observed behavior of a computing resource (also referred to herein as baseline data characterizing actions of a computing resource) can be provided as input to the machine learning model, and the machine learning model can provide the functional role as an output. In some embodiments, training engine 141 can train the machine learning model 160A-N using training data from training data generator 131. In some embodiments, the training data can include data characterizing previously observed behaviors of a computing resource. In some embodiments, the machine learning model 160A-N can refer to the model artifact that is created by the training engine 141 using the training data that includes training inputs and corresponding target outputs (correct answers for respective training inputs). The training engine 141 can find patterns in the training data that map the training input to the target output (the answer to be predicted), and provide the machine learning model 160A-N that captures these patterns. The machine learning model 160A-N can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. In other or similar embodiments, the machine learning model 160A-N can refer to the model artifact that is created by training engine 141 using training data that includes training inputs without providing target outputs. Training engine 141 can find patterns in the training data, identify clusters of data that correspond to the identified patterns, and provide the machine learning model 160A-N that captures these patterns. Machine learning model 160A-N can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc.

In another embodiment, a functional role can be associated with a computing resource based on its observed behavior, e.g., by a set of rules. In some embodiments, each rule of the set of rules can be a descriptive document or an executable program that includes mappings of a functional role to an observed behavior. In some embodiments, the set of rules can be provided by users (e.g., security professionals). In some embodiments, the set of rules can define many-to-one, one-to-many, and many-to-many mappings of functional roles to observed behaviors.

In some embodiments, the security-related controls can include an action (e.g., an operation) to prevent the computing resource 121 from accessing certain data and/or performing a certain action. For example, using the aforementioned example, the security-related control can include an action to prevent the computing resource 121 from performing a data transmission to SSL/TLS port 443, etc.

In some embodiments, a security-related control can be associated with a functional role, e.g., by a machine learning model (e.g., the first machine learning model 160A-N or a second machine learning model 160A-N). For example, the functional role can be provided as input to the machine learning model, and the machine learning model can provide the security-related control as an output. In some embodiments, training engine 141 can train the machine learning model 160A-N using training data from training data generator 131. In some embodiments, the training data can include a set of functional roles performed by a computing resource and/or data characterizing previously observed behaviors of the computing resource. In some embodiments, the machine learning model 160A-N can refer to the model artifact that is created by the training engine 141 using the training data that includes training inputs and corresponding target outputs (correct answers for respective training inputs). The training engine 141 can find patterns in the training data that map the training input to the target output (the answer to be predicted), and provide the machine learning model 160A-N that captures these patterns. The machine learning model 160A-N can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. In other or similar embodiments, the machine learning model 160A-N can refer to the model artifact that is created by training engine 141 using training data that includes training inputs. Training engine 141 can find patterns in the training data, identify clusters of data that correspond to the identified patterns, and provide the machine learning model 160A-N that captures these patterns. Machine learning model 160A-N can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc.

In some embodiments, a security-related control can be associated with a functional role, e.g., by a set of rules. In some embodiments, each rule of the set of rules can be a descriptive document or an executable program that includes mappings of a functional role to a security-related control. In some embodiments, the set of rules can be provided by users (e.g., security professionals). In some embodiments, the set of rules can define many-to-one, one-to-many, and many-to-many mappings of functional roles to security-related controls.

In some implementations, a subsequent behavior of the group of computing resources can be observed (e.g., by monitoring one or more actions of the group of computing resources). A security-related issue (e.g., an incompatibility between the functional role of a computing resource of the group of computing resources and the subsequent behavior of the computing resource) can be detected by matching the subsequent behavior to the functional role (e.g., by a machine learning model or a set of rules, as described herein). Upon detecting the security-related issue, a remedial action can be identified (e.g., by the same or a different machine learning model or a set of rules) and performed with respect to one or more computing resources of the group of computing resources.

In some embodiments, platform 120 can include hardware devices or appliances (e.g., such as the computer system of FIG. 4), software applications, managed services, combinations of the above, etc. Platform 120 can include one or more hardware or software interfaces for communicating with users, computing resources 121, entities associated with computing resources 121, and other relevant parties. For example, platform 120 can include an application programming interface (API) for receiving data (e.g., logs and files) from and providing security-related controls and remedial actions to computing resources 121. As a further example, platform 120 can provide graphical user interfaces (GUIs), command line interfaces (CLIs), or APIs for interacting with other platforms, systems, and/or users such as security professionals. As a further example, platform 120 can be configured to automatically send alert messages (e.g., emails, text messages, etc.) to users and/or entities associated with computing resources 121. In some embodiments, interfaces such as those described above can utilize one or more hardware communication channels or protocols such as Ethernet, USB, PCIe, UART, I2C, SPI, etc. Users can interact with platform 120 to create, update, and/or audit security-related rules for determining a set of security-related controls, to review one or more functional roles of one or more computing resources for accuracy and/or false positives, etc.

Platform 120 and computing resources 121 can be physically or virtually distinct from each other and communicatively connected by network 108. For example, computing resources 121 can be a data center at a first geographical location, and platform 120 can be a software application residing on a server at a second geographical location. Platform 120 and computing resources 121 can be associated with the same entity or with different entities. For example, computing resources 121 can be associated with a client entity, and platform 120 can be associated with a provider entity. The client entity can subscribe to the provider entity's security service and configure computing resources 121 to periodically send data to platform 120 for analysis. The provider entity can include one or more users (e.g., security researchers, security analysts, security engineers, or other security professionals employed by the provider entity) to develop, configure, and/or maintain the analysis capabilities of platform 120, and the provider entity can configure platform 120 to send security-related controls to computing resources 121, the client entity, and/or the users. Platform 120 can include an interface for users associated with the client entity (e.g., security researchers employed by the client entity) to configure platform 120 as well. Cloud-based SIEM providers and software-as-a-service SIEM providers are examples of provider entities.

Platform 120 and computing resources 121 can be components of a computing platform such as a cloud computing platform. A provider entity associated with the cloud computing platform can offer to lease computing resources such as hardware devices, virtual machines, etc., and can provide security platform integrations in association with the leased computing resources. In some embodiments, computing resources 121 and/or platform 120 can be distributed across multiple hardware devices (e.g., within a data center or across disparate geographical locations) and can be communicatively connected via internal networks (not depicted), external networks such as network 108, or a combination thereof. The provider entity can include various users (e.g., security researchers and other professionals/employees) to manage computing resources and security platform(s) of the cloud computing platform. A client entity can provision computing resources 121 along with platform 120 (e.g., simultaneously or at different times). In some embodiments, the cloud computing platform can provide a dedicated platform 120 for each client entity (each client entity provisioning their own dedicated computing resources 121). In some embodiments, the cloud computing platform can serve all client entities with a single platform 120. A client can use a client device to communicate with the cloud computing platform, provision computing resources 121, and platform 120. The client device can be a hardware device such as a laptop or a software application such as a web portal.

Training data generator 131 (i.e., residing at server machine 130) can generate training data to be used to train model 160. Model 160 can be implemented by one or more neural networks accessible to security control engine 151 (e.g., to determine security-related controls to be applied to one or more computing resources 121). In some embodiments, training data generator 131 can generate the training data based on previous actions of one or more computing resources 121 (e.g., stored at data store 110 or another data store connected to system 100 via network 104).

Server machine 140 can include a training engine 141. Training engine 141 can train a machine learning model 160A-N using the training data from training data generator 131. In some embodiments, the machine learning model 160A-N can refer to the model artifact that is created by the training engine 141 using the training data that includes training inputs and corresponding target outputs (correct answers for respective training inputs). The training engine 141 can find patterns in the training data that map the training input to the target output (the answer to be predicted), and provide the machine learning model 160A-N that captures these patterns. The machine learning model 160A-N can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. In other or similar embodiments, the machine learning model 160A-N can refer to the model artifact that is created by training engine 141 using training data that includes training inputs. Training engine 141 can find patterns in the training data, identify clusters of data that correspond to the identified patterns, and provide the machine learning model 160A-N that captures these patterns. Machine learning model 160A-N can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc.

It should be noted that although FIG. 1 illustrates security control engine 151 as part of platform 120, in additional or alternative embodiments, security control engine 151 can reside on one or more server machines that are remote from platform 120 (e.g., server machine 150, server machine 160). It should be noted that in some other implementations, the functions of server machines 130, 140, 150, 160 and/or platform 120 can be provided by a fewer number of machines. For example, in some implementations, components and/or modules of any of server machines 130, 140, 150, 160 may be integrated into a single machine, while in other implementations components and/or modules of any of server machines 130, 140, 150, 160 may be integrated into multiple machines. In addition, in some implementations, components and/or modules of any of server machines 130, 140, 150, 160 may be integrated into platform 120.

In general, functions described in implementations as being performed by platform 120 and/or any of server machines 130, 140, 150, 160 can also be performed on the client devices 102A-N in other implementations. In addition, the functionality attributed to a particular component can be performed by different or multiple components operating together. Platform 120 can also be accessed as a service provided to other systems or devices through appropriate application programming interfaces, and thus is not limited to use in websites.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
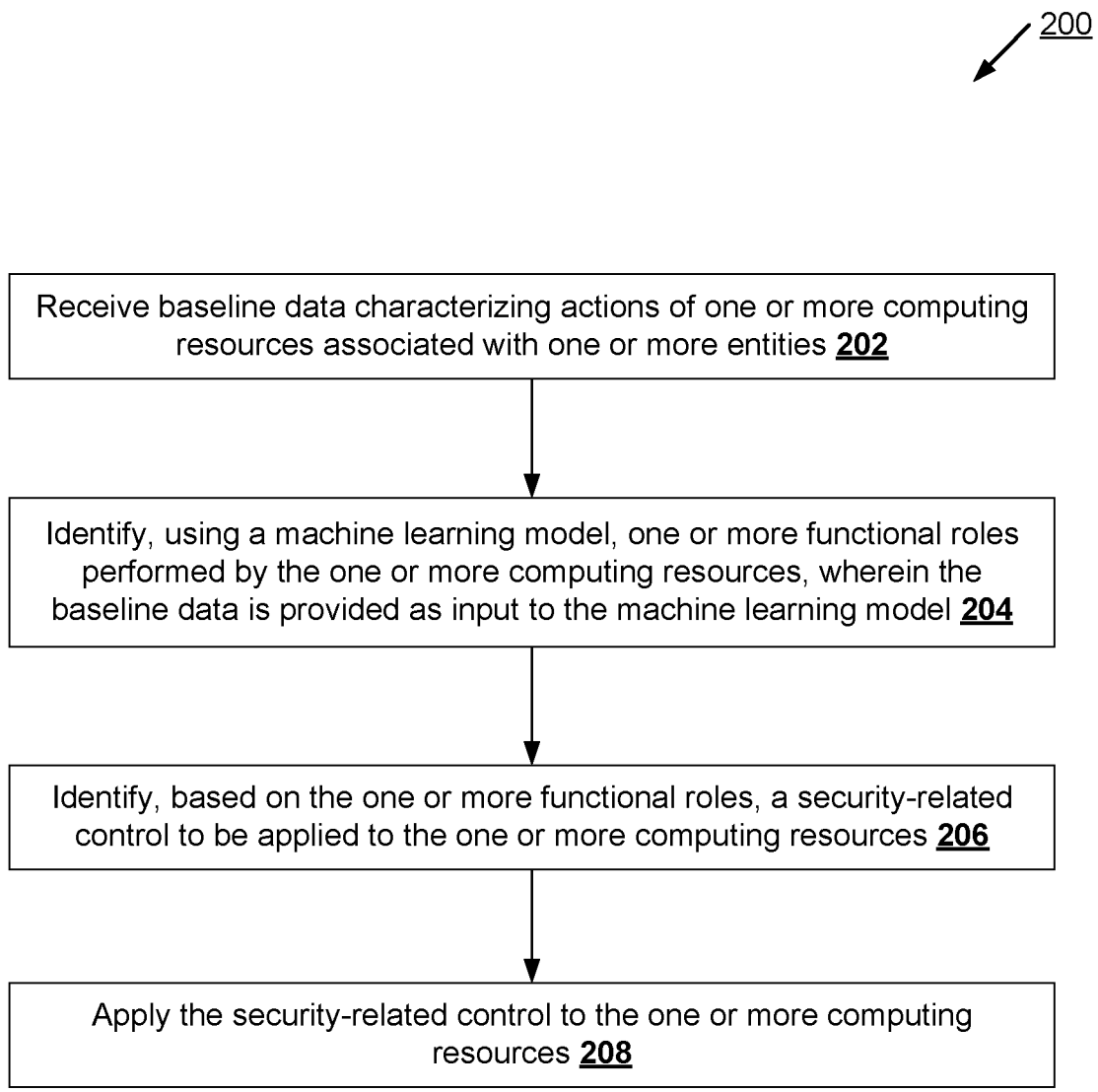
FIG. 2 depicts a flow diagram of an example method, in accordance with implementations of the present disclosure.

FIG. 2 depicts a flow diagram of an example method 200, in accordance with implementations of the present disclosure. Method 200 can be performed by processing logic that can include hardware (circuitry, dedicated logic, etc.), software (e.g., instructions run on a processing device), or a combination thereof. In one implementation, some or all the operations of method 200 can be performed by one or more components of system 100 of FIG. 1. In some embodiments, some or all of the operations of method 200 can be performed by platform 120 and/or security control engine 151, as described above.

At block 202, processing logic receives baseline data characterizing actions of one or more computing resources (e.g., the computing resource 121 of FIG. 1) associated with one or more entities (e.g., the platform 120 and/or the client devices 102A-N of FIG. 1). In some embodiments, the one or more computing resources can include, e.g., hardware, execution environments, application instances, networking infrastructure elements, etc. In some embodiments, the baseline data characterizing the actions of the one or more computing resources can include baseline data of observed behavior of the one or more computing resources. For example, the observed behavior can include any data processing (e.g., computation tasks, data manipulation, etc.), reading and writing data to and from memory, managing data storage, network communication (e.g., data transmission, packet routing, network requests, network traffic originated by the one or more computing resources, network traffic received by the one or more computing resources, etc.), resource allocation, etc. For example, an observed behavior can include a data transmission originated by or received by the one or more computing resources using Secure Sockets Layer (SSL)/Transport Layer Security (TLS) port 443.

At block 204, processing logic identifies one or more functional roles performed by the one or more computing resources. In some implementations, the functional roles can be, e.g., an identification of a type of computing resource (e.g., a web server, an application server, a network interface, a cloud resource, a network resource, a hardware device, etc.).

In some embodiments, the processing logic identifies the one or more functional roles performed by the one or more computing resources using a machine learning model (e.g., a first machine learning model). The processing logic can provide the baseline data received at block 202 as input to the machine learning model. In some embodiments, the machine learning model is trained to predict, based on given data associated with previous actions of the one or more computing resources, one or more functional roles performed by the one or more computing resources. In some embodiments, the processing logic obtains one or more outputs of the machine learning model, wherein the one or more outputs are the one or more functional roles performed by the one or more computing resources. In some embodiments, the machine learning model is trained to predict, based on the given data associated with previous actions of the one or more computing resources, one or more security-related controls associated with each of the one or more functional roles, where the one or more security-related controls are to be applied to the one or more computing resources.

In some embodiments, a training engine (e.g., the training engine 141 of FIG. 1) can train the machine learning model (e.g., the machine learning model 160A-N of FIG. 1) using training data from a training data generator (e.g., the training data generator 131 of FIG. 1). In some embodiments, the training data can include data characterizing previously observed behaviors of a computing resource. In some embodiments, the machine learning model can refer to the model artifact that is created by the training engine using the training data that includes training inputs and corresponding target outputs (correct answers for respective training inputs). The training engine can find patterns in the training data that map the training input to the target output (the answer to be predicted), and provide the machine learning model that captures these patterns. The machine learning model can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. In other or similar embodiments, the machine learning model can refer to the model artifact that is created by training engine using training data that includes training inputs. Training engine can find patterns in the training data, identify clusters of data that correspond to the identified patterns, and provide the machine learning model that captures these patterns. Machine learning model can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc.

In some embodiments, the processing logic identifies the one or more functional roles performed by the one or more computing resources using a set of rules. For example, a functional role can be associated with a computing resource based on its observed behavior, e.g., by a set of rules. In some embodiments, each rule of the set of rules can be a descriptive document or an executable program that includes mappings of a functional role to an observed behavior. In some embodiments, the set of rules can include a rule that excludes a certain functional role. For example, a rule may require that a particular computing resource (e.g., local system software) be not associated with a web server role.

As such, if the output of the machine learning model indicates that the particular computing resource has a functional role of a web server, the processing logic may assess this information, determine that the particular computing resource having properties of a web server indicates a compromise and/or needs further investigation, and generate an alert or send a notification to users (e.g., security professionals). In some embodiments, the set of rules can be provided by users (e.g., security professionals). In some embodiments, the set of rules can define many-to-one, one-to-many, and many-to-many mappings of functional roles to observed behaviors.

At block 206, processing logic identifies a security-related control to be applied to the one or more computing resources. In some embodiments, the security-related controls can include an action (e.g., an operation) to prevent the one or more computing resources from accessing certain data and/or performing a certain action. The processing logic can identify the security-related control based on the one or more functional roles identified at block 204.

In some embodiments, a security-related control can be associated with a functional role, e.g., by a set of security-related rules. In some embodiments, each rule of the set of security-related rules can be a descriptive document or an executable program that includes mappings of a functional role to a security-related control. In some embodiments, the set of security-related rules can be provided by users (e.g., security professionals). In some embodiments, the set of security-related rules can define many-to-one, one-to-many, and many-to-many mappings of functional roles to security-related controls.

In some embodiments, the processing logic can identify the security-related control based on the one or more functional roles by identifying, using the first machine learning model or another (e.g., a second) machine learning model, the security-related control to be applied to the one or more computing resources. The processing logic can provide the one or more functional roles as input to the second machine learning model. In some embodiments, the second machine learning model is trained to predict, based on one or more functional roles performed by the one or more computing resources, one or more security-related controls. In some embodiments, the processing logic obtains one or more outputs of the machine learning model, wherein the one or more outputs are the one or more security-related controls. For example, in some embodiments, a training engine (e.g., the training engine 141 of FIG. 1) can train the second machine learning model (e.g., a second machine learning model 160A-N of FIG. 1) using training data from a training data generator (e.g., the training data generator 131 of FIG. 1). In some embodiments, the training data can include a set of functional roles performed by a computing resource and/or data characterizing previously observed behaviors of a computing resource. In some embodiments, the second machine learning model can refer to the model artifact that is created by the training engine using the training data that includes training inputs and corresponding target outputs (correct answers for respective training inputs). The training engine can find patterns in the training data that map the training input to the target output (the answer to be predicted), and provide the second machine learning model that captures these patterns. The second machine learning model can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. In other or similar embodiments, the second machine learning model can refer to the model artifact that is created by training engine using training data that includes training inputs. Training engine can find patterns in the training data, identify clusters of data that correspond to the identified patterns, and provide the machine learning model that captures these patterns. The second machine learning model can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc.

At block 208, processing logic applies the security-related control identified at block 206 to the one or more computing resources. For example, applying the security-related control can include an action (e.g., an operation) to prevent the one or more computing resources from accessing certain data and/or performing a certain action.

Figure 3:
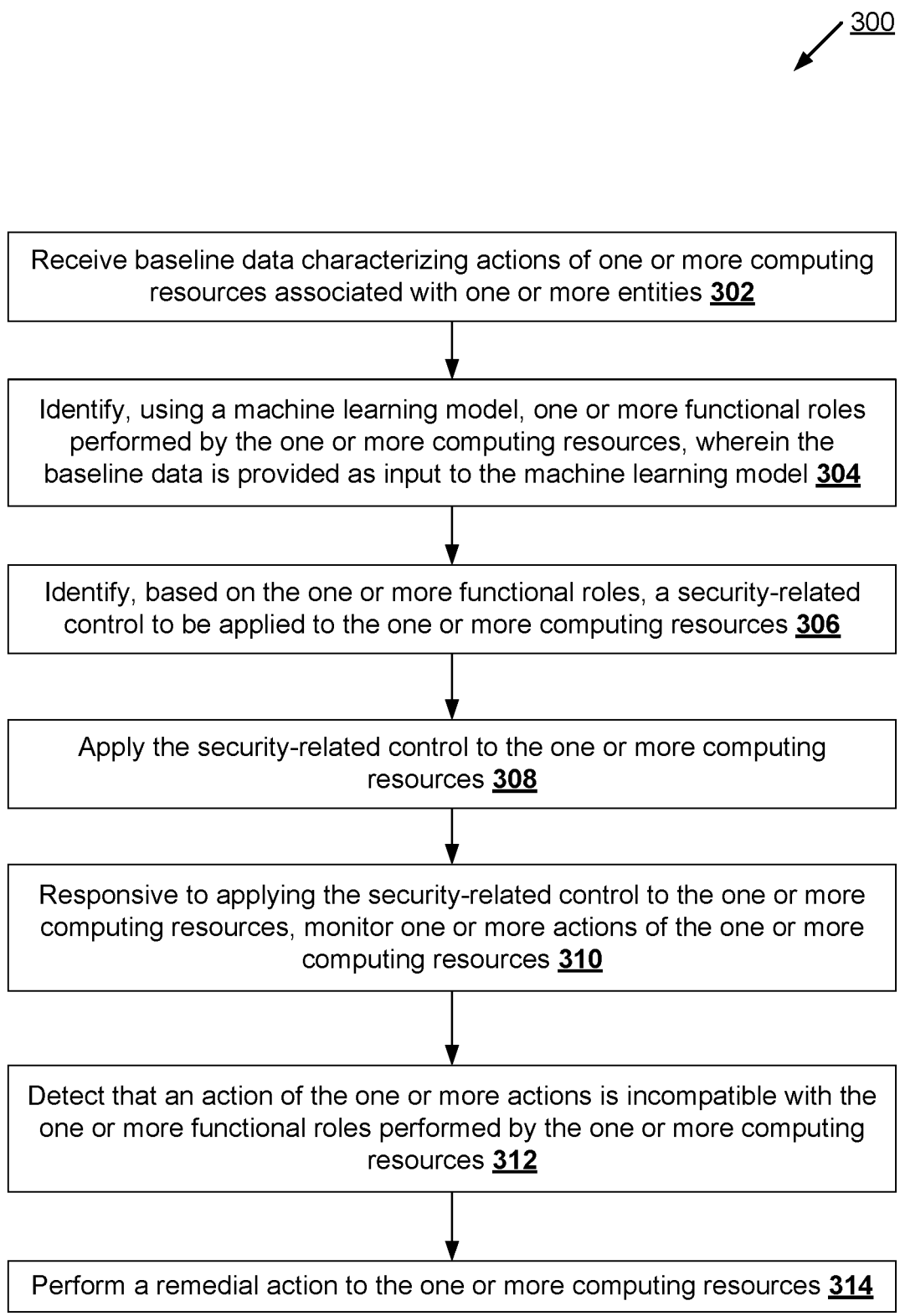
FIG. 3 depicts a flow diagram of another example method, in accordance with implementations of the present disclosure.

FIG. 3 depicts a flow diagram of an example method 300, in accordance with implementations of the present disclosure. Method 300 can be performed by processing logic that can include hardware (circuitry, dedicated logic, etc.), software (e.g., instructions run on a processing device), or a combination thereof. In one implementation, some or all the operations of method 300 can be performed by one or more components of system 100 of FIG. 1. In some embodiments, some or all of the operations of method 300 can be performed by platform 120 and/or security control engine 151, as described above.

At block 302, processing logic receives baseline data characterizing actions of one or more computing resources (e.g., the computing resource 121 of FIG. 1) associated with one or more entities (e.g., the platform 120 and/or the client devices 102A-N of FIG. 1). In some embodiments, the one or more computing resources can include, e.g., hardware, execution environments, application instances, networking infrastructure elements, etc. In some embodiments, the baseline data characterizing the actions of the one or more computing resources can include baseline data of observed behavior of the one or more computing resources. For example, the observed behavior can include any data processing (e.g., computation tasks, data manipulation, etc.), reading and writing data to and from memory, managing data storage, network communication (e.g., data transmission, packet routing, network requests, network traffic originated by the one or more computing resources, network traffic received by the one or more computing resources, etc.), resource allocation, etc. For example, an observed behavior can include a data transmission originated by or received by the one or more computing resources using Secure Sockets Layer (SSL)/Transport Layer Security (TLS) port 443.

At block 304, processing logic identifies one or more functional roles performed by the one or more computing resources. In some implementations, the functional roles can be, e.g., an identification of a type of computing resource (e.g., a web server, an application server, a network interface, a cloud resource, a network resource, a hardware device, etc.).

In some embodiments, the processing logic identifies the one or more functional roles performed by the one or more computing resources using a machine learning model (e.g., a first machine learning model). The processing logic can provide the baseline data received at block 302 as input to the machine learning model. In some embodiments, the machine learning model is trained to predict, based on given data associated with previous actions of the one or more computing resources, one or more functional roles performed by the one or more computing resources. In some embodiments, the processing logic obtains one or more outputs of the machine learning model, wherein the one or more outputs are the one or more functional roles performed by the one or more computing resources. In some embodiments, the machine learning model is trained to predict, based on the given data associated with previous actions of the one or more computing resources, one or more security-related controls associated with each of the one or more functional roles, where the one or more security-related controls are to be applied to the one or more computing resources.

In some embodiments, a training engine (e.g., the training engine 141 of FIG. 1) can train the machine learning model (e.g., the machine learning model 160A-N of FIG. 1) using training data from a training data generator (e.g., the training data generator 131 of FIG. 1). In some embodiments, the training data can include data characterizing previously observed behaviors of a computing resource. In some embodiments, the machine learning model can refer to the model artifact that is created by the training engine using the training data that includes training inputs and corresponding target outputs (correct answers for respective training inputs). The training engine can find patterns in the training data that map the training input to the target output (the answer to be predicted), and provide the machine learning model that captures these patterns. The machine learning model can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. In other or similar embodiments, the machine learning model can refer to the model artifact that is created by training engine using training data that includes training inputs. Training engine can find patterns in the training data, identify clusters of data that correspond to the identified patterns, and provide the machine learning model that captures these patterns. Machine learning model can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc.

In some embodiments, the processing logic identifies the one or more functional roles performed by the one or more computing resources using a set of rules. For example, a functional role can be associated with a computing resource based on its observed behavior, e.g., by a set of rules. In some embodiments, each rule of the set of rules can be a descriptive document or an executable program that includes mappings of a functional role to an observed behavior. In some embodiments, the set of rules can be provided by users (e.g., security professionals). In some embodiments, the set of rules can define many-to-one, one-to-many, and many-to-many mappings of functional roles to observed behaviors.

At block 306, processing logic identifies a security-related control to be applied to the one or more computing resources. In some embodiments, the security-related controls can include an action (e.g., an operation) to prevent the one or more computing resources from accessing certain data and/or performing a certain action. The processing logic can identify the security-related control based on the one or more functional roles identified at block 304.

In some embodiments, a security-related control can be associated with a functional role, e.g., by a set of security-related rules. In some embodiments, each rule of the set of security-related rules can be a descriptive document or an executable program that includes mappings of a functional role to a security-related control. In some embodiments, the set of security-related rules can be provided by users (e.g., security professionals). In some embodiments, the set of security-related rules can define many-to-one, one-to-many, and many-to-many mappings of functional roles to security-related controls.

In some embodiments, the processing logic can identify the security-related control based on the one or more functional roles by identifying, using the first machine learning model or another (e.g., a second) machine learning model, the security-related control to be applied to the one or more computing resources. The processing logic can provide the one or more functional roles and/or data characterizing previously observed behaviors of the one or more computing resources as input to the second machine learning model. In some embodiments, the second machine learning model is trained to predict, based on one or more functional roles performed by the one or more computing resources, one or more security-related controls. In some embodiments, the processing logic obtains one or more outputs of the machine learning model, wherein the one or more outputs are the one or more security-related controls. For example, in some embodiments, a training engine (e.g., the training engine 141 of FIG. 1) can train the second machine learning model (e.g., a second machine learning model 160A-N of FIG. 1) using training data from a training data generator (e.g., the training data generator 131 of FIG. 1). In some embodiments, the training data can include a set of functional roles performed by a computing resource. In some embodiments, the second machine learning model can refer to the model artifact that is created by the training engine using the training data that includes training inputs and corresponding target outputs (correct answers for respective training inputs). The training engine can find patterns in the training data that map the training input to the target output (the answer to be predicted), and provide the second machine learning model that captures these patterns. The second machine learning model can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. In other or similar embodiments, the second machine learning model can refer to the model artifact that is created by training engine using training data that includes training inputs. Training engine can find patterns in the training data, identify clusters of data that correspond to the identified patterns, and provide the machine learning model that captures these patterns. The second machine learning model can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc.

At block 308, processing logic applies the security-related control identified at block 206 to the one or more computing resources. For example, applying the security-related control can include an action (e.g., an operation) to prevent the one or more computing resources from accessing certain data and/or performing a certain action.

At block 310, processing logic monitors one or more actions of the one or more computing resources. In some embodiments, the processing logic monitors the one or more actions by observing a subsequent behavior of the one or more computing resources. In some embodiments, the processing logic monitors the one or more actions in response to applying the security-related control to the one or more computing resources at block 308.

At block 312, processing logic detects (e.g., determines) that a subsequent action of the one or more actions is incompatible with the one or more functional roles performed by the one or more computing resources as determined at block 304. For example, the processing logic can detect a security-related issue (e.g., an incompatibility between the one or more functional roles performed by the one or more computing resources and the one or more actions of the one or more computing resources).

In some embodiments, the processing logic can detect that the action is incompatible with the one or more functional roles performed by the one or more computing resources by determining that the action is not included in a set of actions (e.g., a set of permissible actions) that is associated with the functional role determined at block 304. Each functional role can be associated with a set of actions, where the set of actions can be derived from the baseline data characterizing the actions of the one or more computing resources. For example, the set of actions can be derived, for each functional role, using a machine learning model (e.g., the first machine learning model described at operation 304). For example, the baseline data characterizing the actions of the one or more computing resources can be provided as input to the first machine learning model. The first machine learning model can provide, as output, the one or more functional roles and an associated set of actions for each functional role of the one or more functional roles.

As described above, each functional role can be associated with a set of actions, where the set of actions is derived from the baseline data characterizing the actions of the one or more computing resources. In some embodiments, the set of actions can be derived, for each functional role, using a set of rules. In some embodiments, each rule of the set of rules can be a descriptive document or an executable program that includes mappings of a functional role to one or more actions of a computing resource. In some embodiments, the set of rules can be provided by users (e.g., security professionals). In some embodiments, the set of rules can define many-to-one, one-to-many, and many-to-many mappings of functional roles to one or more actions of computing resources.

In some embodiments, the processing logic can detect that the action is incompatible with the one or more functional roles performed by the one or more computing resources by determining that the action does not satisfy one or more compliance requirements that is associated with the one or more functional roles. For example, the one or more compliance requirements can be provided by users (e.g., security professionals), one or more entities (e.g., the platform 120 and/or client devices 102A-102N of FIG. 1), etc. The one or more compliance requirements can be included in a descriptive document or an executable program that includes mappings of a functional role to the one or more compliance requirements. Some examples of compliance requirements can include information security compliance requirements, data security compliance requirements, data privacy compliance requirements, etc. In some embodiments, compliance requirements can be defined by compliance standards or compliance policies.

At block 314, processing logic performs a remedial action with respect to the one or more computing resources. In some embodiments, the processing logic performs the remedial action in response to detecting that the action is incompatible with the one or more functional roles performed by the one or more computing resources. In some embodiments, the remedial action can include sending an alert (e.g., a message, notification, etc.) to an administrative component (e.g., an administrative component of a security platform, such as the platform 120 of FIG. 1, or a user of a client device, such as the client devices 102A-N of FIG. 1). In some embodiments, the remedial action can include preventing the computing resource from performing the action (e.g., blocking network traffic, stopping a server, etc.).

Figure 4:
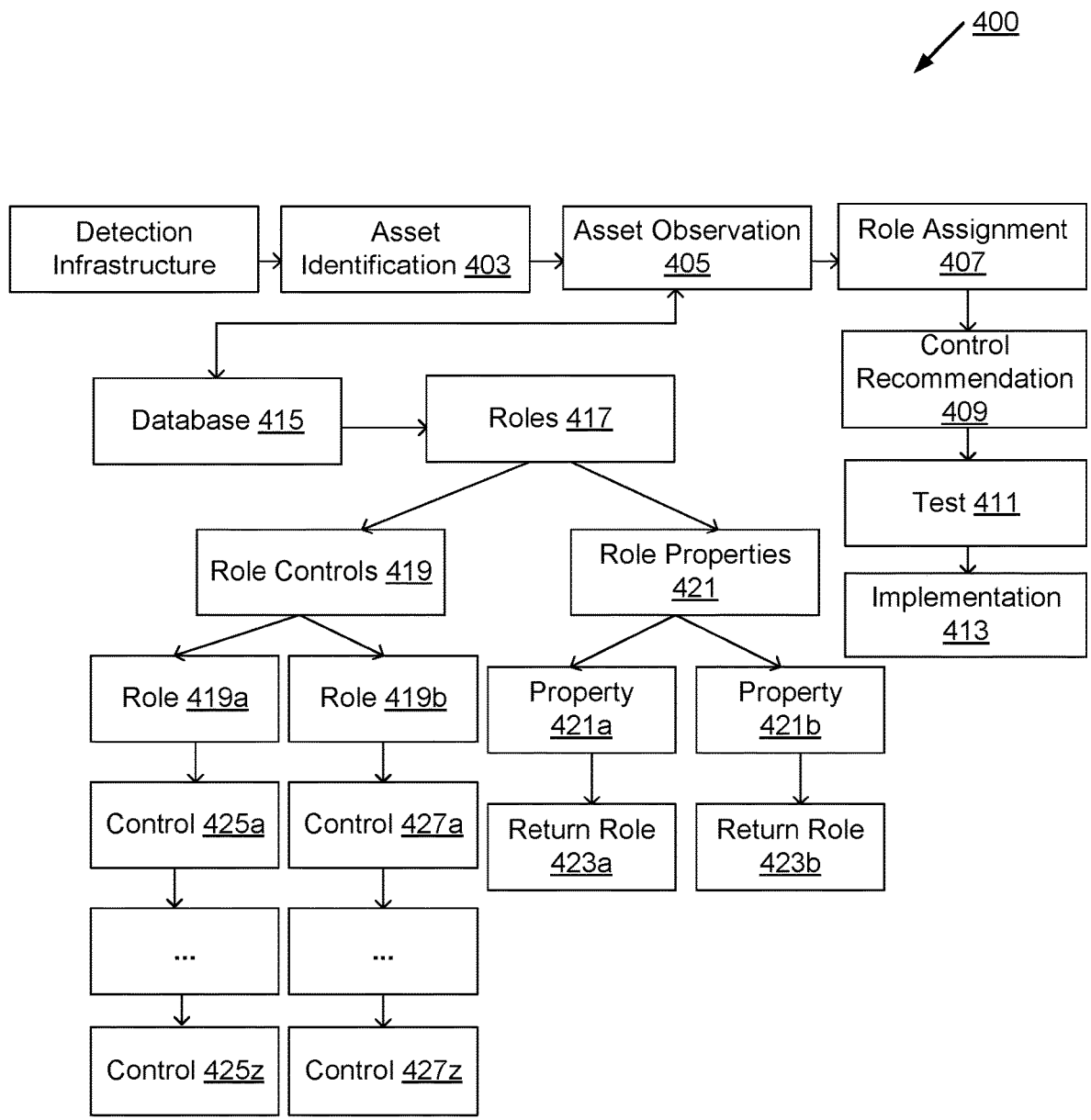
FIG. 4 depicts a flow diagram of another example method, in accordance with implementations of the present disclosure.

FIG. 4 depicts a flow diagram of an example method 400, in accordance with implementations of the present disclosure. Method 400 can be performed by processing logic that can include hardware (circuitry, dedicated logic, etc.), software (e.g., instructions run on a processing device), or a combination thereof. In one implementation, some or all the operations of method 400 can be performed by one or more components of system 100 of FIG. 1. In some embodiments, some or all of the operations of method 400 can be performed by platform 120 and/or security control engine 151, as described above.

At block 403, processing logic (e.g., a detection infrastructure, such as the platform 120 and/or the security control engine 151 of FIG. 1) can identify one or more assets (e.g., computing resources) of one or more entities. In some embodiments, the one or more computing resources can include, e.g., hardware, execution environments, application instances, networking infrastructure elements, etc.

At block 405, processing logic can perform an observation of (e.g., scan) of one or more of the computing resources and obtain baseline data characterizing actions of the one or more computing resources. In some embodiments, the baseline data characterizing the actions of the one or more computing resources can include baseline data of observed behavior of the one or more computing resources. For example, the observed behavior can include any data processing (e.g., computation tasks, data manipulation, etc.), reading and writing data to and from memory, managing data storage, network communication (e.g., data transmission, packet routing, network requests, network traffic originated by the one or more computing resources, network traffic received by the one or more computing resources, etc.), resource allocation, etc. For example, an observed behavior can include a data transmission originated by or received by the one or more computing resources using Secure Sockets Layer (SSL)/Transport Layer Security (TLS) port 443. In some embodiments, a database 415 (e.g., the data store 110 of FIG. 1) can include data corresponding to one or more roles 417 (also referred to as "functional roles"). Each role 417 can be associated with one or more security-related controls 419 and one or more role properties 421. In some embodiments, security-related role 419a can include a set of security-related roles 425a-425z. In another example, security-related role 419b can include a set of security-related roles 427a-427b. In some embodiments, each role property 421 can specify a corresponding security-related role for a particular role property (e.g., a behavior associated with the one or more computing resources). For example, role property 421a is associated with a corresponding security-related role 423a. In another example, role property 421b is associated with a corresponding security-related role 423b. Each of the roles 417 can be associated with one or more security-related controls 419 using a machine learning model and/or a set of rules, as described with respect to FIGS. 2-3.

At block 407, the processing logic identifies the one or more functional roles performed by the one or more computing resources using a machine learning model. The processing logic can provide the baseline data received at block 302 as input to the machine learning model. In some embodiments, the machine learning model is trained to predict, based on given data associated with previous actions of the one or more computing resources, one or more functional roles performed by the one or more computing resources. In some embodiments, the processing logic obtains one or more outputs of the machine learning model, wherein the one or more outputs are the one or more functional roles performed by the one or more computing resources. In some embodiments, the machine learning model is trained to predict, based on the given data associated with previous actions of the one or more computing resources, one or more security-related controls associated with each of the one or more functional roles, where the one or more security-related controls are to be applied to the one or more computing resources. Further detail with respect to the machine learning model is described with respect to FIGS. 2-3. In some embodiments, the processing logic identifies the one or more functional roles performed by the one or more computing resources using a set of rules. Further detail with respect to the set of rules is described with respect to FIGS. 2-3.

At block 409, processing logic identifies a security-related control to be applied to the one or more computing resources. In some embodiments, the security-related controls can include preventing the one or more computing resources from accessing certain data and/or performing a certain action. The processing logic can identify the security-related control based on the one or more functional roles identified at block 407. Further detail with respect to identifying the security-related control is described with respect to FIGS. 2-3.

At block 411, processing logic performs simulation testing using the security-related control identified at block 409. At block 413, processing logic implements (e.g., applies) the security-related control to the one or more computing resources. Further detail with respect to applying the security-related control is described with respect to FIGS. 2-3.

Figure 5:
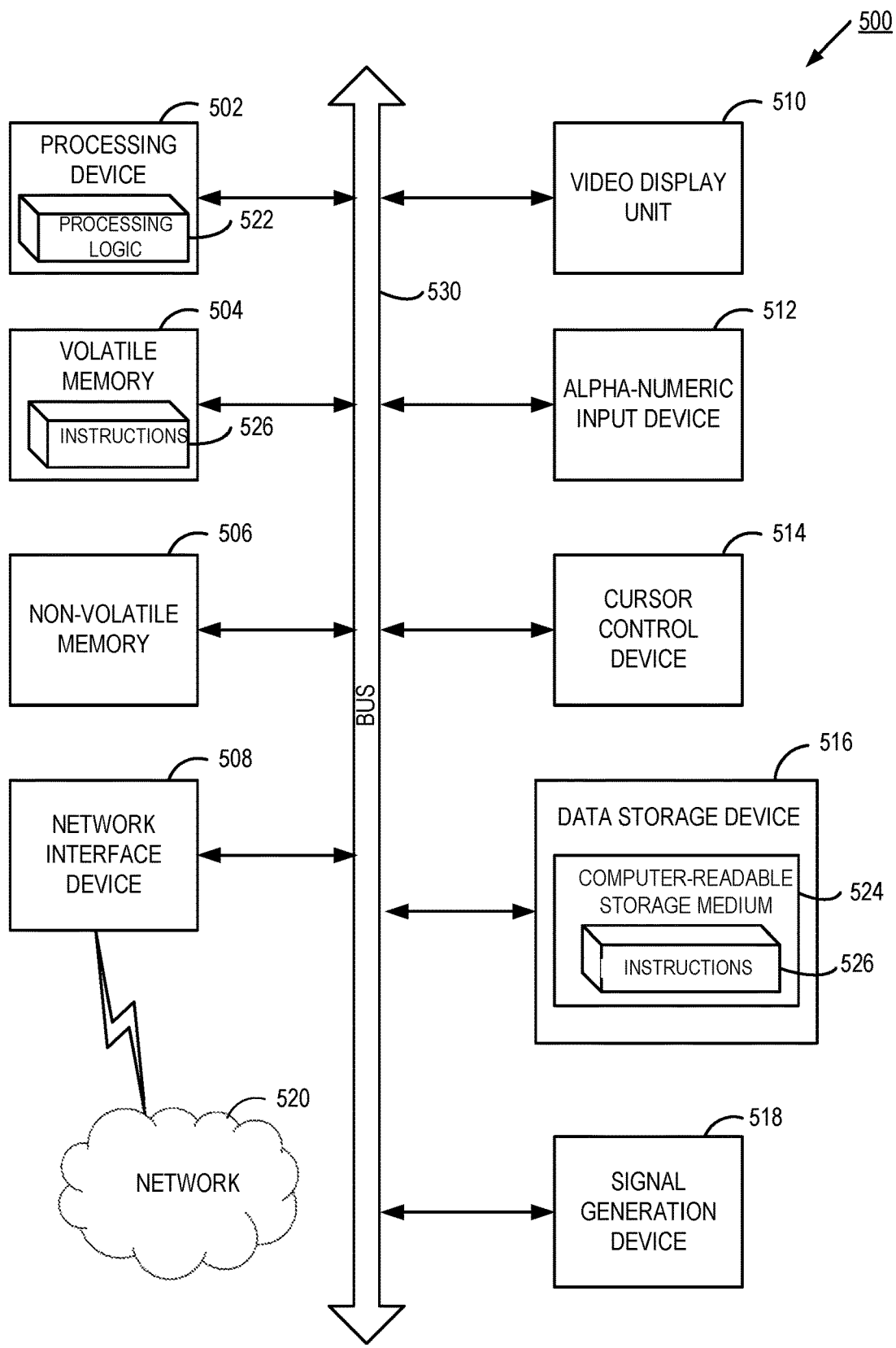
FIG. 5 is a block diagram illustrating an exemplary computer system, in accordance with implementations of the present disclosure.

FIG. 5 is a block diagram illustrating an exemplary computer system 500, in accordance with implementations of the present disclosure. The computer system 500 can correspond to platform 120 and/or client devices 102A-N, described with respect to FIG. 1. Computer system 500 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 540.

Processor (processing device) 502 represents one or more general-purpose processing devices such as a microprocessor, central processing unit, or the like. More particularly, the processor 502 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 can also be one or more special-purpose processing devices such as an application specific integrated circuit (ASIC), a field programmable gate array (FPGA), a digital signal processor (DSP), network processor, or the like. The processor 502 is configured to execute instructions 505 for performing the operations discussed herein.

The computer system 500 can further include a network interface device 508. The computer system 500 also can include a video display unit 510 (e.g., a liquid crystal display (LCD) or a cathode ray tube (CRT)), an input device 512 (e.g., a keyboard, and alphanumeric keyboard, a motion sensing input device, touch screen), a cursor control device 514 (e.g., a mouse), and a signal generation device 520 (e.g., a speaker).

The data storage device 518 can include a non-transitory machine-readable storage medium 524 (also computer-readable storage medium) on which is stored one or more sets of instructions 505 embodying any one or more of the methodologies or functions described herein. The instructions can also reside, completely or at least partially, within the main memory 504 and/or within the processor 502 during execution thereof by the computer system 500, the main memory 504 and the processor 502 also constituting machine-readable storage media. The instructions can further be transmitted or received over a network 530 via the network interface device 508.

In one implementation, the instructions 505 include instructions for providing behavioral modeling for dynamic security control applications. While the computer-readable storage medium 524 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium"

shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
   receiving, by a processing device, baseline data characterizing actions of one or more computing resources associated with one or more entities;
   identifying, using a machine learning model, one or more functional roles performed by the one or more computing resources, wherein the baseline data is provided as input to the machine learning model;
   identifying, based on the one or more functional roles, a security-related control to be applied to the one or more computing resources;
   applying the security-related control to the one or more computing resources;
   monitoring one or more actions of the one or more computing resources with the security-related control applied thereon; and
   responsive to detecting that an action of the one or more actions is incompatible with the one or more functional roles performed by the one or more computing resources, causing a remedial action to be performed with respect to the one or more computing resources.

2. The method of claim 1, wherein the machine learning model is trained to predict, based on given data associated with previous actions of the one or more computing resources, the one or more functional roles performed by the one or more computing resources.

3. The method of claim 1, wherein the baseline data characterizing the actions of the one or more computing resources is based on at least one of network traffic originated by the one or more computing resources, or network traffic received by the one or more computing resources.

4. The method of claim 1, wherein identifying, based on the one or more functional roles, the security-related control to be applied to the one or more computing resources comprises:
   identifying, for the one or more functional roles, one or more associated security-related rules; and
   determining, according to the one or more associated security-related rules, the security-related control to be applied to the one or more computing resources.

5. The method of claim 4, wherein the one or more associated security-related rules is specified by a user associated with the one or more entities.

6. The method of claim 1, wherein identifying, based on the one or more functional roles, the security-related control to be applied to the one or more computing resources comprises:

identifying, using a second machine learning model, the security-related control to be applied to the one or more computing resources, wherein the one or more functional roles and the baseline data characterizing the actions of the one or more computing resources are provided as input to the second machine learning model.

7. The method of claim 1, wherein causing the remedial action to be performed with respect to the one or more computing resources further comprises:

performing the remedial action to the one or more computing resources.

8. The method of claim 7, wherein detecting that the action of the one or more actions is incompatible with the one or more functional roles performed by the one or more computing resources comprises determining that the action is not included in a set of actions associated with the one or more functional roles, wherein the set of actions associated with the one or more functional roles is derived from the baseline data characterizing the actions of the one or more computing resources.

9. The method of claim 7, wherein detecting that the action of the one or more actions is incompatible with the one or more functional roles performed by the one or more computing resources comprises determining that the action does not satisfy one or more compliance requirements associated with the one or more functional roles.

10. A system comprising:

a memory device; and a processing device coupled to the memory device, the processing device to perform operations comprising:

receiving, by a processing device, baseline data characterizing actions of one or more computing resources associated with one or more entities;

identifying, using a machine learning model, one or more functional roles performed by the one or more computing resources, wherein the baseline data is provided as input to the machine learning model;

identifying, based on the one or more functional roles, a security-related control to be applied to the one or more computing resources;

applying the security-related control to the one or more computing resources;

monitoring one or more actions of the one or more computing resources with the security-related control applied thereon; and responsive to detecting that an action of the one or more actions is incompatible with the one or more functional roles performed by the one or more computing resources, causing a remedial action to be performed with respect to the one or more computing resources.

11. The system of claim 10, wherein the machine learning model is trained to predict, based on given data associated with previous actions of the one or more computing resources, the one or more functional roles performed by the one or more computing resources.

12. The system of claim 10, wherein the baseline data characterizing the actions of the one or more computing resources is based on at least one of network traffic originated by the one or more computing resources, or network traffic received by the one or more computing resources.

13. The system of claim 10, wherein to identify, based on the one or more functional roles, the security-related control to be applied to the one or more computing resources, the processing device is to perform operations comprising:

identifying, for the one or more functional roles, one or more associated security-related rules; and determining, according to the one or more associated security-related rules, the security-related control to be applied to the one or more computing resources.

14. The system of claim 10, wherein to identify, based on the one or more functional roles, the security-related control to be applied to the one or more computing resources, the processing device is to perform operations comprising:

identifying, using a second machine learning model, the security-related control to be applied to the one or more computing resources, wherein the one or more functional roles and the baseline data characterizing the actions of the one or more computing resources are provided as input to the second machine learning model.

15. The system of claim 10, wherein causing the remedial action to be performed with respect to the one or more computing resources further comprises:

performing the remedial action to the one or more computing resources.

16. A non-transitory computer-readable medium comprising instructions that, when executed by a processing device, cause the processing device to perform operations comprising:

receiving, by a processing device, baseline data characterizing actions of one or more computing resources associated with one or more entities;

identifying, using a machine learning model, one or more functional roles performed by the one or more computing resources, wherein the baseline data is provided as input to the machine learning model;

identifying, based on the one or more functional roles, a security-related control to be applied to the one or more computing resources;

applying the security-related control to the one or more computing resources;

monitoring one or more actions of the one or more computing resources with the security-related control applied thereon; and responsive to detecting that an action of the one or more actions is incompatible with the one or more functional roles performed by the one or more computing resources, causing a remedial action to be performed with respect to the one or more computing resources.

17. The non-transitory computer-readable medium of claim 16, wherein the machine learning model is trained to predict, based on given data associated with previous actions of the one or more computing resources, the one or more functional roles performed by the one or more computing resources.

18. The non-transitory computer-readable medium of claim 16, wherein the baseline data characterizing the actions of the one or more computing resources is based on at least one of network traffic originated by the one or more computing resources, or network traffic received by the one or more computing resources.

19. The non-transitory computer-readable medium of claim 16, wherein to identify, based on the one or more functional roles, the security-related control to be applied to the one or more computing resources, the processing device is to perform operations comprising:

identifying, for the one or more functional roles, one or more associated security-related rules; and determining, according to the one or more associated security-related rules, the security-related control to be applied to the one or more computing resources.

20. The non-transitory computer-readable medium of claim 16, wherein causing the remedial action to be performed with respect to the one or more computing resources further comprises:
performing the remedial action to the one or more computing resources.

* * * * *